(12) United States Patent
Morse

(10) Patent No.: US 6,987,912 B2
(45) Date of Patent: Jan. 17, 2006

(54) EPITAXIAL GROWTH FOR WAVEGUIDE TAPERING

(75) Inventor: Michael T. Morse, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 10/808,787

(22) Filed: Mar. 23, 2004

(65) Prior Publication Data

US 2004/0180552 A1 Sep. 16, 2004

Related U.S. Application Data

(62) Division of application No. 10/159,238, filed on May 31, 2002.

(51) Int. Cl.
| | |
|---|---|
| *G02B 6/10* | (2006.01) |
| *G02B 6/26* | (2006.01) |
| *G02B 6/42* | (2006.01) |
| *C03B 37/22* | (2006.01) |
| *C03C 25/00* | (2006.01) |

(52) U.S. Cl. .......................... 385/43; 385/129; 65/386; 65/473

(58) Field of Classification Search ................ 385/129, 385/43

See application file for complete search history.

(56) References Cited

U.S. PATENT DOCUMENTS

| | | |
|---|---|---|
| 4,371,966 A | 2/1983 | Scifres et al. |
| 4,773,720 A | 9/1988 | Hammer |
| 4,911,516 A | 3/1990 | Palfrey et al. |
| 5,078,516 A | 1/1992 | Kapon et al. |
| 5,121,182 A | 6/1992 | Kuroda et al. |
| 5,349,602 A | 9/1994 | Mehuys et al. |
| 5,442,723 A | 8/1995 | Vinchant et al. |
| 5,574,742 A | 11/1996 | Ben-Michael et al. |
| 5,708,750 A | 1/1998 | Kevorkian et al. |

(Continued)

FOREIGN PATENT DOCUMENTS

| | | |
|---|---|---|
| EP | 0 821 250 A1 | 1/1998 |
| JP | 52137359 | 11/1977 |
| JP | 53106152 | 9/1978 |
| JP | 05011131 | 1/1993 |
| JP | 09297235 | 11/1997 |
| JP | 11284061 | 10/1999 |
| WO | WO 95/13553 | 5/1995 |
| WO | WO 00/36442 | 6/2000 |
| WO | PCT/US 03/12364 | 8/2003 |
| WO | PCT/US 03/11833 | 10/2003 |

OTHER PUBLICATIONS

Layadi, A., et al., "Low–Loss Optical Waveguide On Standard SOI/SIMOX Substrate," Elsevier Science B.V., Optics Communications, vol. 146, NO. 1–6, Jan. 15, 1998, pp. 31–33, North–Holland Publishing Co., Amsterdam, NL.

(Continued)

*Primary Examiner*—Phan T.H. Palmer
*Assistant Examiner*—James D. Stein
(74) *Attorney, Agent, or Firm*—Blakely, Sokoloff, Taylor & Zafman LLP

(57) ABSTRACT

A method to form a semiconductor taper without etching the taper surfaces. In one embodiment, a semiconductor waveguide is formed on a workpiece having an unetched top surface; e.g., using a silicon insulator (SOI) wafer. A protective layer is formed on the waveguide. The protective layer is patterned and etched to form a mask that exposes a portion of the waveguide in the shape of the taper's footprint. In one embodiment, selective silicon epitaxy is used to grow the taper on the exposed portion of the waveguide so that the taper is formed without etched surfaces. Microloading effects can cause the upper surface of the taper to slope toward the termination end of the taper.

9 Claims, 3 Drawing Sheets

U.S. PATENT DOCUMENTS

| | | | |
|---|---|---|---|
| 5,720,893 | A | 2/1998 | Ben-Michael et al. |
| 5,844,929 | A | 12/1998 | Lealman et al. |
| 5,867,623 | A | 2/1999 | Broquin et al. |
| 5,987,046 | A | 11/1999 | Kobayashi et al. |
| 5,990,530 | A | 11/1999 | Suzuki |
| 6,108,478 | A | 8/2000 | Harpin et al. |
| 6,174,748 | B1 | 1/2001 | Jeon et al. |
| 6,200,502 | B1 | 3/2001 | Paatzsch et al. |
| 6,219,366 | B1 | 4/2001 | Furushima |
| 6,229,947 | B1 | 5/2001 | Vawter et al. |
| 6,293,688 | B1 | 9/2001 | Deacon |
| 6,312,144 | B1 | 11/2001 | Li |
| 6,380,092 | B1 | 4/2002 | Annapragada et al. |
| 6,381,380 | B1 | 4/2002 | Forrest et al. |
| 6,385,371 | B1 | 5/2002 | Li |
| 6,411,764 | B1 | 6/2002 | Lee |
| 6,483,863 | B2 | 11/2002 | Forrest et al. |
| 6,522,801 | B1 | 2/2003 | Aksyuk et al. |
| 6,813,432 | B2 * | 11/2004 | Salib .................. 385/129 |
| 6,816,660 | B2 * | 11/2004 | Nashimoto ............ 385/131 |
| 2002/0131744 | A1 | 9/2002 | Evans et al. |
| 2003/0007766 | A1 | 1/2003 | Galarza et al. |
| 2003/0068152 | A1 | 4/2003 | Gunn, III |

OTHER PUBLICATIONS

Weiss, B.L., et al., "Optical Waveguides in SIMOX Structures," IEEE Photonics Technology Letters, vol. 3, No. 1, Jan. 1991, pp. 19–21, NY, US.

Rickman, A., et al., "Low–Loss Planar Optical Waveguides Fabricated in SIMOX Material," IEEE Photonics Technology Letters, vol. 4, No.6, Jun. 1, 1992, pp. 633–635, NY, US.

Von Bibra, M.L., et al., "Ion Beam Energy Attenuation For Fabrication Of Buried Variable–Depth, Optical Waveguides," Elsevier Science B.V., Nuclear Instruments & Methods In Physics Research, Section B: Beam Interactions with Materials and Atoms, vol. 168, No. 1, May 2000, pp. 47–52, North–Holland Publishing Co., Amsterdam, NL.

Brenner, T., et al., "Vertically Tapered InGaAsP/InP Waveguides for Highly Efficient Coupling to Flat–End Single–Mode Fibers," American Institute of Physics, vol. 65, Aug. 15, 1994, pp. 798–800, Woodbury, NY,US.

Luo, Jianfeng, et al., "Integrated Model for Chemical–Mechanical Polishing Based on A Comprehensive Material Removal Model," Sixth International Conference on Chemical–Mechanical Polish (CMP) Planarization for ULSI Multilevel Interconnection (CMP–MIC), Mar. 8–9, 2001, pp. 1–8.

Smekalin, Konstantin, "CMP Dishing Effects In Shallow Trench Isolation," Magazine vol. 40, Issue 7, Jul. 1, 1997, pp. 1–6.

* cited by examiner

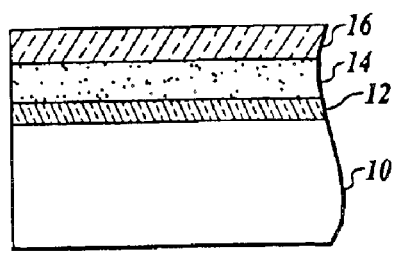
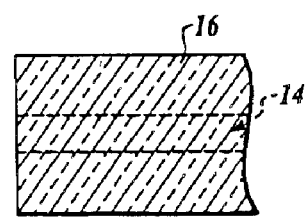
*Fig. 1*  *Fig. 1A*
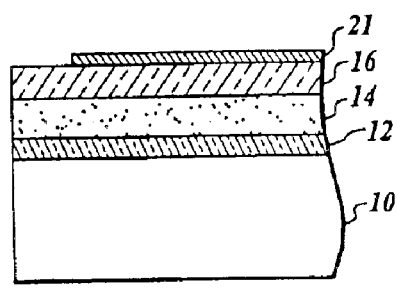
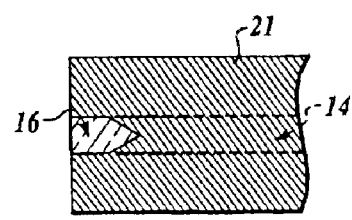
*Fig. 2*  *Fig. 2A*
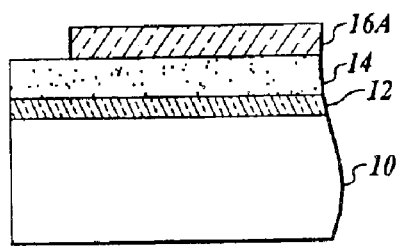
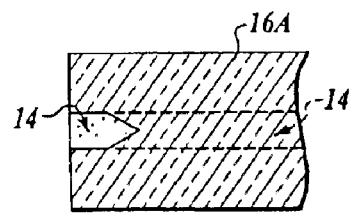
*Fig. 3*  *Fig. 3A*

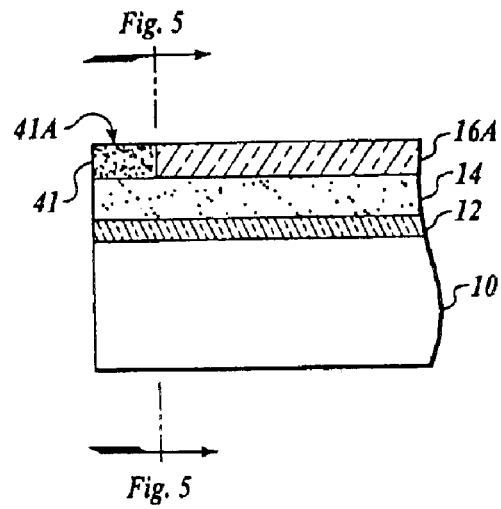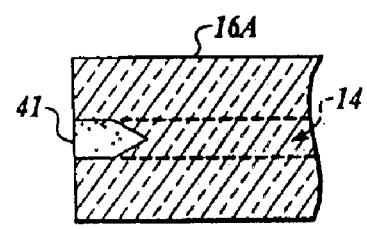
*Fig. 4*  *Fig. 4A*
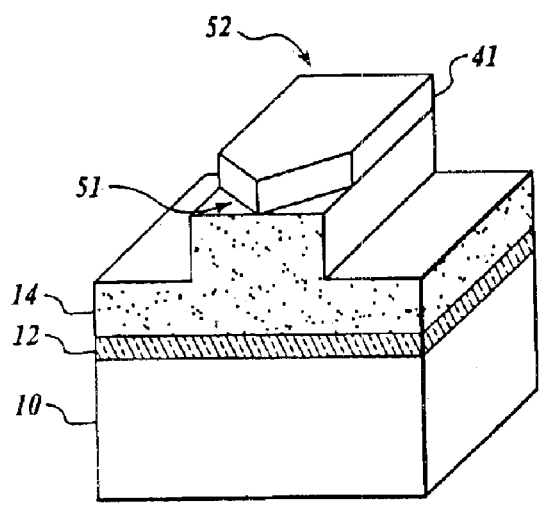
*Fig. 5*

EPITAXIAL GROWTH FOR WAVEGUIDE TAPERING

This application is a Divisional of 10/159,238 filed May 31, 2002.

CROSS REFERENCE TO RELATED APPLICATIONS

This application is a divisional of, and claims priority under 35 U.S.C. § 120 from, U.S. patent application Ser. No. 10/159,238, filed May 31, 2002, and still pending, which is related to commonly-assigned and co-filed U.S. patent application Ser. No. 10/160,625, filed May 31, 2002, entitled "Method For Producing Vertical Tapers In Optical Waveguides By Over Polishing" by M. Salib, and to U.S. patent application Ser. No. 10/159,379, filed May 31, 2002, entitled "Fabrication Of A Waveguide Taper Through Ion Implantation" by M. Salib et al.

FIELD OF THE INVENTION

The field of invention relates to optical communication devices in general; and, more specifically but not limited to waveguide tapers in optical devices.

BACKGROUND

Some optical devices may include a waveguide that is intended to be coupled to another waveguide or fiber having a significantly larger cross-sectional size. For example, a planar lightwave circuit (PLC) can have a waveguide on the order of four microns in width to be coupled an optical fiber with a diameter of about ten microns. One way to couple a port of a relatively large waveguide to a port of a significantly smaller waveguide is by forming a tapered waveguide structure to couple the two waveguides. In one type of taper, the taper at one end has a width or diameter of about the same size as the larger waveguide. At the other end, the taper comes to a point. The sides of the taper are typically straight so that the taper has a wedge-like shape, with the taper narrowing from the wide end to the point or narrow end. The wide end of the taper is used to couple the taper from the larger waveguide. The idea behind this taper is to create a virtual, vertical effective index change in the waveguide that forces the mode into an underlying, single-mode waveguide. As the taper becomes narrower, the effective index decreases, and the mode moves lower in the semiconductor material.

One conventional technique to form the above-described taper when the smaller waveguide is a semiconductor waveguide is to etch one end of the smaller waveguide to form the taper. For example, at the end of the waveguide, the smaller waveguide has: (a) a length about equal to the desired length of the taper; and (b) a thickness that is about equal to the sum of the desired thickness of the smaller waveguide and the desired thickness of the taper. For example, the resulting thickness can be about the height of the core of an optical fiber. This end of the smaller waveguide is then etched using standard etching techniques to form the taper with a shape as described above. However, some etching processes form the taper's point so that it appears eroded, instead of the desired sharp edge or point. This erosion can degrade performance of the taper. In addition, typical etching processes cause the etched surfaces to be significantly less smooth than the surfaces that are not etched. This roughness can increase the waveguide's loss (e.g., in some tests the etched surfaces increased loss an addition five to ten decibels).

BRIEF DESCRIPTION OF THE DRAWINGS

Non-limiting and non-exhaustive embodiments of the present invention are described with reference to the following figures, wherein like reference numerals refer to like parts or elements having the same or substantially similar functions and/or structures throughout the various views unless otherwise specified. Further, terms such as "top", "upper", "lower", "vertical", "lateral", "beneath", etc. may be used herein in describing the figures. These terms are used in a relative sense to show relative orientation of the parts or elements as depicted in the figures and not necessarily with respect gravity or as physical embodiments may be oriented during use.

FIGS. 1 and 1A are representative cross-sectional and top views of an initial stage in fabricating a taper, according to one embodiment of the present invention.

FIGS. 2 and 2A are representative cross-sectional and top views of another stage in fabricating a taper, respectively, according to one embodiment of the present invention.

FIGS. 3 and 3A are representative cross-sectional and top views of still another stage in fabricating a taper, respectively, according to one embodiment of the present invention.

FIGS. 4 and 4A are representative cross-sectional and top views of yet another stage in fabricating a taper, respectively, according to one embodiment of the present invention.

FIG. 5 is a representative isometric perspective view of a section cut as indicated in FIG. 4, according to an embodiment of the present invention.

DETAILED DESCRIPTION OF PREFERRED EMBODIMENTS

Figure 6:
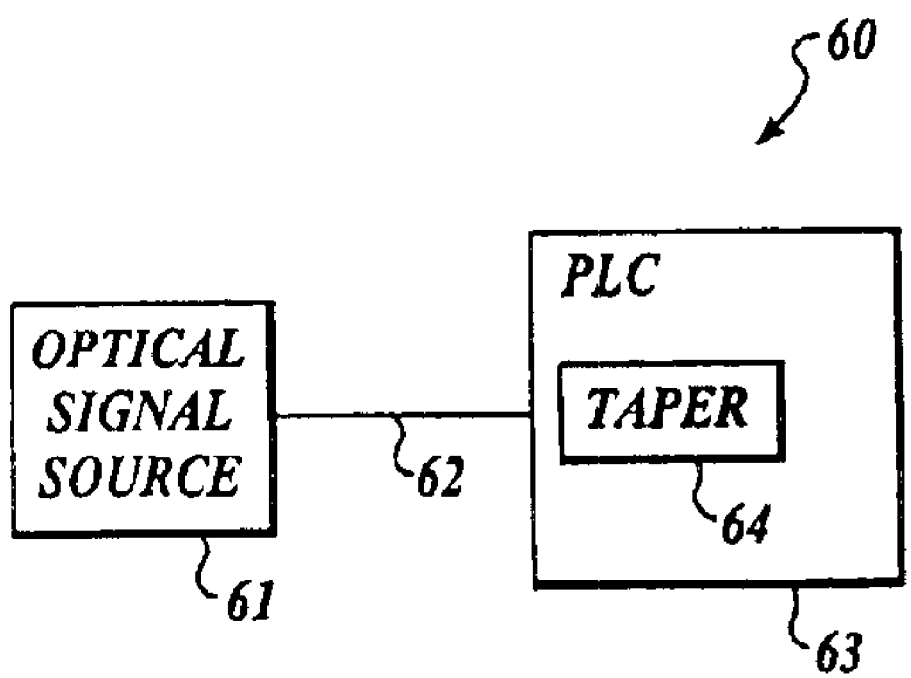
FIG. 6 is a block diagram illustrating an exemplary system using a taper fabricating according to the present invention.

FIG. 1 illustrates a partial cross-section of a semiconductor workpiece (not to scale) during an early stage in fabricating a taper, according to one embodiment of the present invention. The workpiece includes a semiconductor substrate 10, an insulator layer 12, a silicon layer 14, and a protective layer 16. Silicon layer 14 is formed so as to serve as a waveguide. In one embodiment, silicon layer 14 is formed so as to serve as a rib waveguide.

More particularly, insulating layer 12 is formed between semiconductor substrate 10 and silicon layer 14. In this embodiment, semiconductor substrate 10 is formed from silicon; however, semiconductor substrate 10 can be formed from different semiconductor materials in other embodiments (e.g., Gallium Arsenide). Further, in this embodiment, insulating layer 12 is formed from a silicon oxide (e.g., $SiO_2$), although in other embodiments insulating layer 12 can be formed from other non-conductive materials.

In one embodiment, semiconductor substrate 10, insulator layer 12 and silicon layer 14 are formed using known silicon on insulator (SOI) wafer fabrication processes. For example, the buried oxide layer (i.e., insulating layer 12) can be formed using known oxygen implantation processes. Insulating layer 12, in this embodiment, has a thickness of about 1 $\mu$m, but can range from about 0.35 $\mu$m to 2 $\mu$m in other embodiments. Further, in this embodiment, silicon layer 14 is about 2.5 $\mu$m, but can range from about 1 $\mu$m to 10 $\mu$m in other embodiments.

Protective layer 16 is formed on silicon layer 14. In this embodiment, protective layer 16 is a silicon oxide formed using a suitable known process. For example, protective layer 16 can be formed by thermal oxidation of silicon layer 14, or using a low temperature oxide (LTO) deposition process. In one embodiment, protective layer 16 is formed from oxide with a thickness of about 5 µm. In other embodiments, the protective layer can have a different thickness. A thickness greater than 1 µm helps prevent lateral growth of an epitaxial silicon layer formed in a subsequent stage (described below) in fabricating the taper.

Although an oxide protective layer is described above, in other embodiments, protective layer 16 can be formed from other materials (e.g., a silicon nitride material). FIG. 1A illustrates a top view of the resulting structure (not to scale), with protective layer 16 being the only layer that is visible. However, the area occupied by the rib waveguide (i.e., silicon layer 14) under protective layer 16 is indicated with dashed lines in FIG. 1A.

FIG. 2 illustrates a partial cross-section of the semiconductor workpiece (not to scale) during another stage in fabricating a taper, according to one embodiment of the present invention. In this stage, a photoresist layer 21 is formed on protective layer 16 and is patterned to define the taper using known photolithographic processes. In this embodiment, photoresist layer 21 is patterned so that it forms the inverse of the taper.

FIG. 2A illustrates a top view of the resulting structure (not to scale). As shown, photoresist layer 21 is patterned so that a portion of protective layer 16 is left uncovered. As will be described below, this uncovered portion defines the "foot print" of the taper to be formed in a subsequent stage of the taper fabrication process. In this embodiment, the wide end of the taper footprint has the same width as the waveguide formed by silicon layer 14, although in other embodiments, the width may be different. Further, the shape of the tapers footprint may be different in other embodiments (e.g., triangular rather than pentagonal as in FIG. 2A). The termination end of the taper footprint forms a relatively sharp angle (e.g., a few degrees), although the termination end may be truncated in other embodiments.

FIG. 3 illustrates a partial cross-section of the semiconductor workpiece (not to scale) during another stage in fabricating a taper, according to one embodiment of the present invention. In this stage, the uncovered portion of protective layer 16 (FIG. 2) is etched so that silicon layer 14 is exposed, with the portion of protective layer 16 (FIG. 2) under photoresist layer 21 (FIG. 2) remaining intact. As shown in FIG. 3, the remaining portion of the protective layer is indicated as protective layer 16A.

In one embodiment, a suitable known anisotropic etching process (e.g., a dry etching process such as reactive ion etching) is used to etch the portion of protective layer 16 (FIG. 2) left uncovered by photoresist layer 21 (FIG. 2). In other embodiments, different etching processes can be used. Photoresist layer 21. (FIG. 2) is then stripped or removed using standard photolithographic processes. A partial cross section of the resulting structure is represented in FIG. 3. As shown in FIG. 3, the termination end of the taper mask formed by protective layer 16A is a point. In other embodiments, the termination need not be a point (e.g., the termination end may appear as in FIG. 3 but with the point truncated).

FIG. 3A illustrates a top view of the resulting structure (not to scale). As shown, protective layer 16A is exposed after photoresist layer 21 (FIG. 2) is removed. In addition, a portion of silicon layer 14 is exposed after the protective layer is etched.

FIG. 4 illustrates a partial cross-section of the semiconductor workpiece (not to scale) during another stage in fabricating a taper, according to one embodiment of the present invention. In this stage, a silicon layer 41 is formed on the exposed portion of silicon layer 14. In one embodiment, a suitable known selective silicon epitaxy process in which silicon is "grown" on the exposed portion of silicon layer 14 while not growing on protective layer 16A. In one embodiment, silicon layer 41 has a thickness of about 4 µm; however, in other embodiments silicon layer 41 can have a thickness of about 2 µm to about 8 µm. The optimal thickness of silicon layer 41 can depend at least in part on the width or diameter of the larger waveguide (e.g., optical fiber) to be coupled to the taper. The growth of silicon layer 41 is constrained by the side walls of protective layer 16A so that silicon layer 41 is formed in the desired taper shape. In one embodiment, the selective silicon epitaxy process is terminated when the thickness of silicon layer 41 reaches the thickness of protective layer 16A. In other embodiments, the growth of silicon layer 41 can be terminated before its thickness reaches that of protective layer 16A.

This stage of the taper fabrication process represents a significant improvement over conventional processes that etch silicon to form the taper. For example, as previously described, etching the silicon undesirably results in erosion or "erosion-like" effects at the narrow or point end of the taper, increasing loss. In addition, the upper surface of the silicon waveguide may be undesirably "roughened" by the etching process (e.g., feature sensitivity), further increasing loss.

In contrast, by depositing silicon to form the taper in accordance with embodiments of the present invention, the point or narrow end of the taper is not eroded. Rather, the narrow end is essentially smooth and sharp, which tends to enhance performance of the resulting taper. In addition, the waveguide is not etched after protective layer 16 (FIG. 2) is formed. Thus, the resulting upper surface of the waveguide (i.e. silicon layer 14) is significantly smoother than an etched surface. Consequently, the waveguide formed by silicon layer 14 will generally have less loss than one that is etched to form the taper.

In addition, selective silicon epitaxy processes can be sensitive to the surface topology of the growing surface (e.g., micro-loading). In one embodiment, this topology sensitivity is taken advantage of to form silicon layer 41 with a sloped upper surface. That is, the selective silicon epitaxy process will tend to grow silicon at a slower rate near the narrow end of the taper because at that end, the sidewalls of protective layer 16A start getting closer and closer until they meet, changing the micro-loading in that area. As a result, the upper surface of silicon layer 41 will tend to slop downwards from the wide end of the taper to the narrow end of the taper as indicated by surface 41A in FIG. 4. This vertical slope of the taper can further increase the performance efficiency of the taper.

In other embodiments, a polysilicon layer can be deposited on protective layer 16A and then planarized by chemical mechanical polishing (CMP) so that the upper surface of protective layer 16A is exposed. However, this alternative embodiment can in some instances form the taper without the sloped upper surface that can be achieved using a selective silicon epitaxy process.

FIG. 4A illustrates a top view of the resulting structure (not to scale). As shown, silicon layer 41 is visible, laterally surrounded by protective layer 16A. In this embodiment, the termination end of the taper includes two surfaces that are angled so that the termination end is shaped like a wedge. As previously described, these surfaces of the wedge are not etched, which can advantageously increase the performance efficiency of the taper compared to conventional tapers that form the termination using etching processes.

FIG. 5 illustrates a perspective view of a section cut as indicated in FIG. 4, with protective layer 16A omitted so that the taper (i.e., silicon layer 41) and the waveguide (i.e., silicon layer 14) can be more easily appreciated. In addition to protective layer 16A, another protective layer (not shown) may be formed on silicon layer 41. As shown in FIG. 5, the termination end (i.e., end 51) of the taper includes surfaces that are angled with respect to the longitudinal axis of the taper. In this embodiment, the longitudinal axis is along the line connecting the center of the termination end 51 of the taper to the center of the wide end 52 of the taper.

FIG. 6 illustrates a system 60 in which a waveguide taper according to embodiments of the present invention can be used. System 60 includes an optical signal source 61 connected to one end of an optical fiber 62. The other end of optical fiber 62 is connected to a PLC 63 that includes a taper 64. Taper 64 is fabricated according to one of the embodiments described above. For example, when the taper is implemented as shown in the embodiment of FIG. 5, wide end 51 would be used to connect PLC 63 to the end of optical fiber 62. In one embodiment, PLC 63 is implemented in an integrated circuit. Other embodiments may have one or more other tapers (not shown) that are essentially identical in structure to taper 64.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media or other electronic form. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for fabricating a taper, comprising:

disposing a semiconductor waveguide on a substrate;

forming a protective layer on the semiconductor waveguide;

removing a portion of the protective layer to expose a portion of the semiconductor waveguide, the exposed portion of the semiconductor waveguide defining a footprint of the taper; and forming a semiconductor layer on the exposed portion of the semiconductor waveguide to form the taper, the taper having a termination end and a longitudinal axis, wherein the termination end has at least one unetched surface that is angled relative to the longitudinal axis.

2. The method of claim 1 wherein the semiconductor waveguide is formed using a silicon on insulator (SOI) wafer.

3. The method of claim 1 wherein the protective layer comprises an oxide.

4. The method of claim 1 wherein the semiconductor layer is formed using a selective silicon epitaxy process.

5. The method of claim 4 wherein the semiconductor layer is formed into the taper without etching the semiconductor layer.

6. The method of claim 4 wherein the semiconductor layer has a sloped upper surface.

7. The method of claim 6 wherein the sloped upper surface is formed without etching the semiconductor layer.

8. The method of claim 1 wherein forming the semiconductor layer comprises depositing semiconductor material on the protective layer and the exposed portion of the semiconductor waveguide, followed by chemical mechanical polishing to expose the protective layer.

9. The method of claim 1 wherein a insulator layer is disposed beneath the semiconductor waveguide.

* * * * *